Patented Jan. 7, 1947

2,414,012

UNITED STATES PATENT OFFICE 2,414,012

COPOLYMERS OF HIGHER BUTADIENES

Cecil E. Boord, Columbus, Ohio, assignor to Wingfoot Corporation, Akron, Ohio, a corporation of Delaware No Drawing. Application June 30, 1942,
Serial No. 449,155

3 Claims. (Cl. 260—84.5)

This invention relates to polymers and copolymers which contain higher diene hydrocarbons.

The higher dienes used in preparing the polymers and copolymers of this invention contain at least 6-carbon atoms and may contain as many as 10- or more carbon atoms. They may be referred to generally as the dehydration products of 1-alken-4-ols. It has been found that these compounds, when added to copolymerization reactions involving butadiene, such as, for example, the copolymer of butadiene with styrene or the copolymer of butadiene with acrylonitrile, valuable changes are brought about in the properties of the copolymers. The dienes are themselves readily polymerized under conditions which are unfavorable for such copolymerizations.

The dienes are prepared by dehydration of the 1-alken-4-ols. The 1-alken-4-ols may be prepared by activating magnesium turnings suspended in dry ether with a small portion of allyl chloride or other straight chain hydrocarbon halide containing a double bond between the alpha and beta carbon atoms, and then adding dropwise with stirring a solution of a ketone or aldehyde together with a further quantity of a solution of allyl chloride in dry ether. The reaction mixture is then worked up in the usual manner for carrying out a Grignard reaction. Instead of allkyl chloride, derivatives thereof, such as methallyl chloride, ethallyl chloride, etc., may be used.

In the dehydration such agents as $KHSO_4$, oxalic acid, $H_3PO_4$, $Al_2O_3$, iodine, etc., may be used.

The following equations illustrate the reactions:

$CH_2:CH.CH_2Cl + CH_3.CO.CH_2.CH_3 + Mg \rightarrow$
$CH_2:CH.CH_2.COMgCl(CH_3).CH_2.CH_3$
Addition of water$\rightarrow$
$CH_2:CH.CH_2.COH(CH_3).CH_2.CH_3$ On dehydration$\rightarrow C_7H_{12}$ as a mixture of heptadienes, the compounds formed being dependent, at least in part, on the catalyst used for the dehydration. The mixture may conceivably contain one or more of the following:

$CH_2:CH.CH_2.C(:CH_2).CH_2.CH_3$
2-ethyl-1,4-pentadiene $CH_2:CH.CH_2.C(CH_3):CH.CH_3$
4-methyl-1,4-hexadiene $CH_2:CH.CH:C(CH_3).CH_2.CH_3$
4-ethyl-1,3-hexadiene $CH_3.CH:CH.C(:CH_2).CH_2.CH_3$
2-ethyl-1,3-pentadiene $CH_3.CH_2.CH:C(CH_3).CH:CH_2$
3-methyl-1,3-hexadiene $CH_3.CH:CH.C(CH_3):CH.CH_3$
3-methyl-2,4-hexadiene The following is another illustrative example:
2,4-dimethyl-1-hexen-4-ol was prepared by using the following reagents in the manner described above.

| | | |
|---|---|---|
| Magnesium turnings | grams | 194 |
| Methallyl chloride | do | 724 |
| Methyl ethyl ketone | do | 461 |
| Dry ether | c. c. | 2400 |

The portion of the product distilling at 154–170° C. at 735 mm. pressure was dehydrated by mixing 40–80 gram portions of it with one half their weight of $KHSO_4$ and slowly distilling the mixture at 190–200 mm. pressure. The distillate stratified in two layers, and the lower, aqueous layer was separated and discarded. The dried, organic layer was fractionated to give some unchanged alcohol and almost exclusively 2,4-dimethyl-2,4-hexadiene.

In the case of dehydration of 4-methyl-1-hepten-4-ol with $KHSO_4$, a mixture of isomeric octadienes was obtained, which was fractionated to give two main fractions: (1) B. 112–115° C., and (2) B. 128–131° C. The structure of these dienes has not been determined.

The following table lists other higher dienes and the organic starting materials from which they may be prepared by a similar reaction:

(a) 2,4-dimethyl-2,4-decadiene. Methallyl chloride and methyl-n-hexyl ketone.
(b) 2-methyl-2,4-heptadiene. Methallyl chloride and n-butyraldehyde.
(c) 2,4-dimethyl-2,4-heptadiene. Methallyl chloride and methyl-n-propyl ketone.
(d) Octadienes (see above). Allyl chloride and methyl-n-propyl ketone.
(e) 2-methyl-2,4-decadiene. Methallyl chloride and heptaldehyde.

According to this invention, the dienes having more than five carbon atoms, for example, any of those mentioned above, are interpolymerized with butadiene and styrene or with butadiene and acrylonitrile in the typical way. For example, 20 parts of 3% sodium oleate solution containing 0.133 part sodium perborate and 0.48 part carbon tetrachloride together with 16 grams of the mixed monomers may be sealed in a glass tube and tumbled at about 5° C. until shrinkage of the charge (which is a measure of the extent of polymerization) has substantially ceased. The time required for completion of the reaction may vary from about 80 to 160 hours for the production of laboratory batches, using, for example, 16 grams of the mixed monomers. The amount of the higher diene employed should be at least 5% of the total weight of the monomers and may vary from that point upward. A preferred type of copolymer contains about 5 to 40% of the diene. 100% of the higher diene may be polymerized without the addition of any monomer for copolymerization.

The following table gives typical information regarding the polymers formed by mixing different higher dienes with different monomers in different proportions.

| Monomers | Per cent | Yield | Properties |
|---|---|---|---|
| Butadiene | 60 | 81.2 | Very tough, soft rubber. |
| Styrene | 25 | | |
| 2,4-di Me-2,4 hexadiene | 15 | | |
| Butadiene | 67.5 | 95.5 | Medium tough, firm rubber. |
| Styrene | 25 | | |
| 2,4-di Me-2,4 decadiene | 7.5 | | |
| Butadiene | 60 | 91.5 | Medium tough, soft rubber. |
| Styrene | 25 | | |
| 2,4-di Me-2,4 decadiene | 15 | | |
| Butadiene | 60 | 87.0 | Soft, slightly tacky rubber. |
| Styrene | 25 | | |
| Dehydration product of 4-methyl-1-hepten-4-ol with KHSO$_4$, B. 128–130° C | 15 | | |
| Butadiene | 67.5 | 93.7 | Soft rubber. |
| Acrylo nitrile | 25 | | |
| Dehydration product of 4-methyl-1-hepten-4-ol with KHSO$_4$, B. 128–130° C | 7.5 | | |
| Butadiene | 60 | 91.5 | Do. |
| Acrylo nitrile | 25 | | |
| Dehydration product of 4-methyl-1-hepten-4-ol with KHSO$_4$, B. 128–130° C | 15 | | |

It will be noted that the conjugated aliphatic diolefinic hydrocarbons used in the above examples contain from 8 to 12 carbon atoms; also that the copolymers, whose properties are listed, comprise 10 parts by weight of acrylonitrile or styrene to 24 to 27 parts by weight of butadiene-1,3. In accordance with the present invention these components are copolymerized with from 5 to 40 per cent (based on the total weight of polymerizable monomers) of the conjugated hydrocarbon containing from 8 to 12 carbon atoms.

In referring to the copolymerization of butadiene with styrene and the copolymerization of butadiene with acrylic nitrile, these copolymerization reactions are mentioned as typical and are intended to include the copolymerization of derivatives of the monomers mentioned including, for example, chloro butadiene, alkoxy and alkyl substituted styrenes, alpha alkyl acrylonitriles; acrylates, methacrylates, etc.

What I claim is:

1. A rubber-like copolymer of 10 parts by weight of a monomer of the group consisting of styrene and acrylonitrile, 24 to 27 parts of butadiene-1,3 and 5 to 40 percent (based on the total weight of polymerizable monomers) of a conjugated aliphatic olefinic hydrocarbon containing from 8 to 12 carbon atoms.

2. A rubber-like copolymer of 10 parts by weight of styrene and 24 to 27 parts of butadiene-1,3 and 5 to 40 percent (based on the total weight of polymerizable monomers) of 2,4-dimethyl-2,4-hexadiene.

3. A rubber-like copolymer of 10 parts by weight of acrylonitrile, 24 to 27 parts of butadiene-1,3, and 5 to 40 per cent (based on the total weight of polymerizable monomers) of a conjugated hydrocarbon containing from 8 to 12 carbon atoms.

CECIL E. BOORD.